(12) United States Patent
Scholl et al.

(10) Patent No.: US 7,012,514 B2
(45) Date of Patent: Mar. 14, 2006

(54) SYSTEM FOR FACILITATING THE LAUNCH OF A DRAG RACING VEHICLE

(75) Inventors: William J. Scholl, Clare, IL (US); Todd C. Westberg, Rockford, IL (US)

(73) Assignee: Auto Meter Products, Inc., Sycamore, IL (US)

( * ) Notice: Subject to any disclaimer, the term of this patent is extended or adjusted under 35 U.S.C. 154(b) by 153 days.

(21) Appl. No.: 10/346,739

(22) Filed: Jan. 17, 2003

(65) Prior Publication Data

US 2004/0039512 A1    Feb. 26, 2004

Related U.S. Application Data

(60) Provisional application No. 60/401,319, filed on Aug. 6, 2002.

(51) Int. Cl.
*B60Q 1/00* (2006.01)

(52) U.S. Cl. ............ 340/441; 340/439; 340/456; 340/461; 340/457; 324/160; 324/169; 701/64; 701/110; 701/115

(58) Field of Classification Search .......... 340/441, 340/461, 466, 969, 978, 439, 456, 457; 701/64, 701/110, 115; 324/160, 166, 170, 161, 169
See application file for complete search history.

(56) References Cited

U.S. PATENT DOCUMENTS

| | | | |
|---|---|---|---|
| 4,262,641 A | 4/1981 | Mosely et al. | 123/335 |
| 4,492,112 A * | 1/1985 | Igarashi et al. | 73/117.3 |
| 4,550,596 A * | 11/1985 | Ueda | 73/117.3 |
| 4,868,756 A * | 9/1989 | Kawanabe et al. | 701/123 |
| 4,873,891 A * | 10/1989 | Guanciale | 74/625 |
| 5,017,916 A * | 5/1991 | Londt et al. | 340/870.13 |
| 5,471,894 A | 12/1995 | McFadden | 74/336 R |
| 5,722,293 A | 3/1998 | McFadden | 74/336 R |
| 5,761,628 A * | 6/1998 | Steeby et al. | 701/64 |
| 5,982,168 A * | 11/1999 | Westberg et al. | 324/160 |
| 6,041,276 A | 3/2000 | John et al. | 701/67 |
| 6,137,399 A * | 10/2000 | Westberg et al. | 340/441 |
| 6,166,629 A | 12/2000 | Hamma et al. | 340/438 |
| 6,304,814 B1 * | 10/2001 | Masters et al. | 701/110 |
| 6,625,562 B1 * | 9/2003 | Hayashi et al. | 702/145 |

* cited by examiner

*Primary Examiner*—Thomas J. Mullen, Jr.
*Assistant Examiner*—Tai T. Nguyen
(74) *Attorney, Agent, or Firm*—Jenkens & Gilchrist

(57) ABSTRACT

A performance enhancement system incorporating a controller, an engine tachometer and a visual indicator light which illuminates within a predetermined range of engine RPMs and which may be separately mounted as required in the driver's visual focal plane to reduce visual distractions, aiding the driver in optimizing torque transference to the tires of a drag racing vehicle.

12 Claims, 4 Drawing Sheets

SYSTEM FOR FACILITATING THE LAUNCH OF A DRAG RACING VEHICLE

CROSS REFERENCE TO RELATED APPLICATION

This application is a non-provisional which claims priority to U. S. Provisional Application Ser. No. 60/401,319 filed Aug. 6, 2002.

FIELD OF THE INVENTION

This invention is directed generally to systems for facilitating the launch of drag race vehicles and, more particularly, to facilitate the launch of such a vehicle with its engine running at a desired RPM.

BACKGROUND OF THE INVENTION

In the field of competitive automotive racing known as "Drag Racing," there are different levels and types of drag race vehicles. The highest levels of vehicle types and race modes are the professional enthusiasts that are subsidized by the sponsorship of a large or major corporate entity. These race vehicles and their operation require substantial financial support that generally only the income of a large corporate entity is capable of bearing. Descending below the professional level are those levels that are less demanding financially and in technological sophistication. As these levels descend, the number of participants increases, partially as a result of the reduced financial and mechanical burdens that accompany the higher level competitor/enthusiasts. These various levels are often referred to as "brackets" or "indexes," and their participants are those involved in "bracket racing" or "index racing."

There are organizations that manage and sponsor many drag racing events on a national, regional or local scale. The lower indexes or brackets are primarily made up of participants and/or enthusiasts who are not professionally compensated or funded by sponsorship. The vehicle requirements for this type of competition are far less demanding. A generally accepted term for these racing enthusiasts and brackets is "Sportsmen Bracket racing." The participants are usually individuals who rely on their income from some other endeavor to provide financial support for their vehicle maintenance and participation. The engines involved in this level of racing are generally the original equipment from the automobile manufacturers (commonly known as "stock" engine) with limited improvements, modifications or enhancements through after-market, consumer-oriented engine parts commonly referred to as "bolt-on's." The level of sophistication and intricacy for installation and/or operation is significantly less than those performed at the professional level.

In keeping with the desire for level competition, the various national sanctioning organizations have created certain rules and limitations on the types of technology that enthusiasts in various levels may employ in their vehicles. In the Sportsmen index/bracket, some races are conducted to see how closely a participant may complete the race distance in a prescribed time frame, such as one-quarter of a mile in no less than 10.031 seconds. It is the vital to the success of anyone participating in one of these types of races to get a "good launch" or start from the starting line at the correct moment. Should a racer not have his engine revved up to the most efficient level to start or "launch" from the starting line, his or her opponent may leave the line first and enjoy an advantage throughout the race. If the racer should happen to have his or her engine revved too high, there is a good possibility that the instantaneous transfer of the torque developed by the engine at that level into the transmission may, at best, cause tremendous spinning of the tires and liquefaction of the tires' surfaces from the friction between the lane surface and the tire rubber. This results in a momentary flotation of the vehicle on the liquid rubber, thus delaying the departure of the vehicle from the starting line and also giving the racer's opponent an advantage throughout the race. Achieving the optimum revolutions per minute level for a "good launch," moments prior to the start of the race, is a primary and significant element to successful competition.

Since the sanctioning organizations limit the modifications, improvements or enhancements participants may employ in their vehicles, the ability to achieve the optimum engine RPM for maximum torque transference is left to the driver's sensory capabilities. In the present application of the engine tachometer in the race vehicle, the Sportsmen index/bracket participants position the tachometer in such a way that they may be able to look at the tachometer to determine the level of engine RPM as indicated by the tachometer dial pointer, and then look toward the series of lights (commonly known as the "Christmas Tree") positioned to signal the starting of the race. As a general practice, most Sportsmen index/bracket racers first look at the tachometer dial face to verify the engine RPM, then listen to the sound level of the engine while switching their visual focus to the Christmas Tree to react to the start signal of the race. The Sportsmen index/bracket participants try to elevate the engine RPM to a level that will generate optimum torque transference to the tires, thus effecting efficient "launch" from the starting line. While raising the engine RPM by depressing the vehicle accelerator pedal, the driver must also hold the vehicle in place by depressing the vehicle brake pedal. Thus, the driver must incorporate three of the five senses simultaneously in the hopes of achieving a successful start.

In the Sportsmen indexes/brackets, the national sanctioning organizations allow for the usage of the tachometer and a "shift light" that is incorporated with the tachometer to visually notify the vehicle driver when the engine achieves a predetermined RPM that will efficiently enable transmission gear selection. Such a device currently is not held by any sanctioning body to be a modification, improvement or enhancement of the vehicle engine and is widely believed to support consistent performance by its users, which elevates the level of competition.

SUMMARY OF THE INVENTION

In accordance with the present invention, a system for facilitating the launch of a drag racing vehicle with the engine running within a predetermined RPM range comprises a tachometer coupled to the engine for monitoring the RPM of the engine, an indicator light positioned in the driver's compartment in the vehicle, a power source for supplying power to the indicator light for illuminating the light, a controllable switch connected between the power source and the indicator light for controlling when the power source is connected to the light and thus when the light is illuminated, and a controller connected to the tachometer and the switch for actuating the switch to illuminate the indicator light when the tachometer indicates that the engine is running at an RPM within the predetermined RPM range.

In a preferred embodiment of the invention, the controller actuates the switch to flash the indicator light when the tachometer indicates that the engine is running at an RPM above the predetermined range and to extinguish the indicator light when the tachometer indicates that the engine is running at an RPM below the predetermined range. The indicator light can be moved to different positions within said driver compartment for different race contexts, e.g., depending on whether the "Christmas Tree" is on the left or right side of the vehicle. A keypad or other manual input is used to supply the controller with a desired engine RPM for launch.

In another embodiment of the invention, the indicator light is mounted to be used as a heads-up display by reflecting on the windshield of the drag racing vehicle, adjustable to reflect near field of view of the "Christmas Tree" thus obtaining an optimum viewing focal plane.

In still another embodiment of the invention, a second switch is connected to the vehicle braking system such that the indicator light is only enabled while the brake pedal is depressed, thus removing any distractions after the launch of the drag racing vehicle.

The above summary of the present invention is not intended to represent each embodiment, or every aspect, of the present invention. This is the purpose of the figures and the detailed description which follow.

BRIEF DESCRIPTION OF THE DRAWINGS

The foregoing and other features of the invention will become apparent upon reading the following detailed description and upon reference to the drawings, in which.

DETAILED DESCRIPTION OF THE ILLUSTRATED EMBODIMENT

Figure 1:
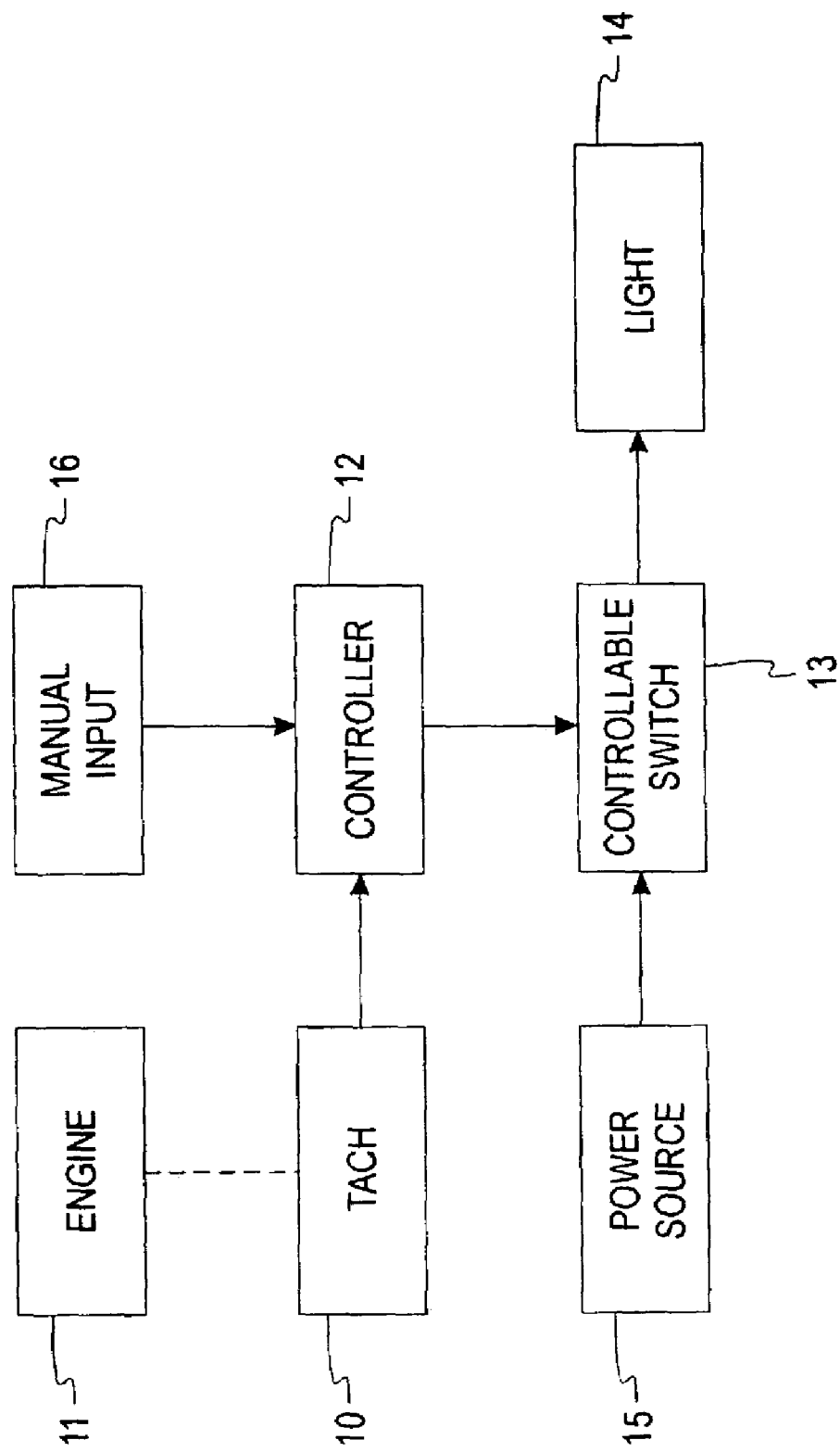
FIG. 1 is a block diagram of a system embodying the invention.

While the invention is susceptible to various modifications and alternative forms, a specific embodiment has been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

Referring now to the drawings, and initially to FIG. 1, a conventional tachometer 10 is coupled to the engine 11 in a drag racing vehicle to monitor the RPM of the engine output, such as the drive shaft or a component that rotates at a speed proportional to that of the drive shaft. The output of the tachometer is fed to a controller 12 that controls the actuation of a switch 13 connected between an indicator light 14 and a power source 15 for the light 14. Thus, the controller 12 controls when and how the light 14 is illuminated.

The controller 12 also receives a signals from a manual input device 16, such as a keypad, which enables the driver to select the engine RPM desired at the start of the race. When the user selects the desired RPM, the controller 12 automatically sets an RPM range extending 100 RPM above and below the selected value. For example, if the user selects 6500 RPM, the controller sets the range at 6400–6600 RPM. It will be understood that the use of a 200-RPM range is simply one example, and the controller can be designed to set other, wider or narrower, ranges. Alternatively, the controller may be designed to allow the user to select the range via the manual input device 16. As will be described in more detail below, the controller 12 causes the light 14 to be illuminated whenever the engine RPM is within the set range.

Figure 2:
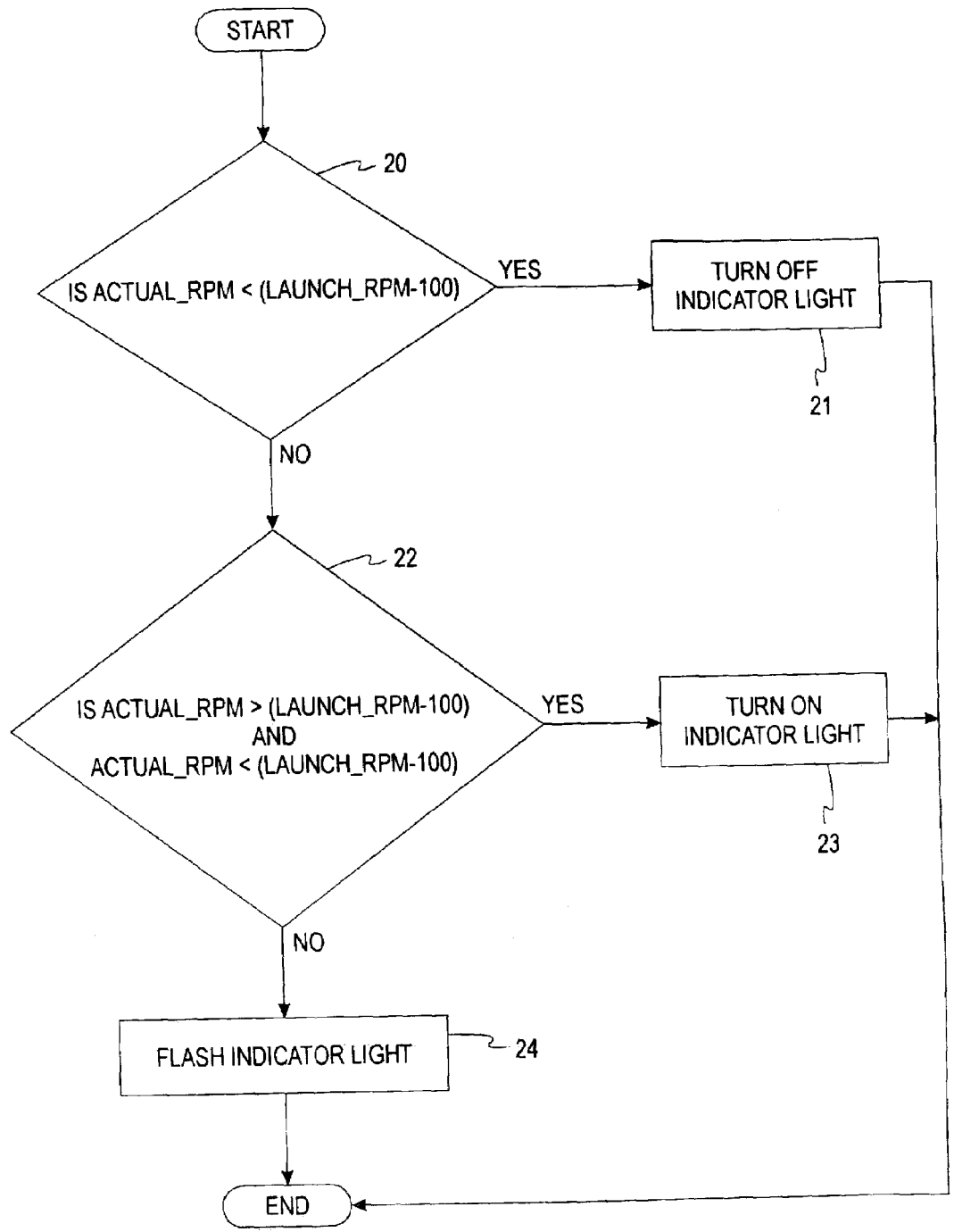
FIG. 2 is a flow chart of a portion of the software in the controller in the system of FIG. 1.

FIG. 2 is a flow chart illustrating the operation of the controller 12, which is preferably implemented as a microprocessor having built-in memory containing an operating program. The user-selected RPM value received from the manual input device is stored as LAUNCH_RPM in the controller, and is used to compute two values (LAUNCH_RPM−100) and (LAUNCH_RPM+100) that define the set range and are also stored in the memory. The actual RPM value received by the controller from the tachometer 10 is designated ACTUAL_RPM. Step 20 of the program in FIG. 2 determines whether ACTUAL_RPM is less than (LAUNCH_RPM−100). If the answer is affirmative, the indicator light 14 is turned off (or kept off) at step 21.

If the answer at step 20 is negative (indicating that ACTUAL_RPM is greater than (LAUNCH_RPM−100), the program advances to step 22 to determine whether ACTUAL_RPM is less than (LAUNCH_RPM+100). If the answer is affirmative, indicating that ACTUAL_RPM is between (LAUNCH_RPM−100) and (LAUNCH_RPM+100), the indicator light is turned on at step 23. This signals the driver that the RPM of the engine is within a narrow range centered on the desired RPM.

A negative answer at step 22 indicates that ACTUAL_RPM is above (LAUNCH_RPM+100), which means that the engine speed is excessive. In this case, the controller causes the indicator light to flash by closing and opening the switch 13 repetitively at a relatively fast rate at step 24. This signals the driver that the engine is revving too fast and should be slowed down.

Thus, the illustrative system notifies the Sportsmen index/bracket participants when their vehicle engines have achieved the desired optimum level of revolutions per minute to enable a "good launch" from the starting line. By controlling the activation of the indicator light through the tachometer and controller, the driver may preset the launch reading at the desired level, in conjunction with the application of the brake system. With the brake engaged, and the engine revolutions being increased through the accelerator pedal application, the indicator light does not illuminate until the preset RPM level is achieved. Upon realizing the preset level, the indicator light illuminates in a constant beam, provided the RPM is maintained within a predetermined range (e.g., such as: 6500±100 RPM). In the preferred embodiment, if the driver should depress the accelerator pedal to a point that increases the engine RPM beyond the predetermined range (such as 6750 RPM), the indicator light then begins to flash intermittently to notify the driver that the engine RPM is beyond the desired range.

The usage of the indicator light alone as a device to notify the driver of achieving the desired RPM level reduces the demand upon the driver's sensory abilities by 33%, thus enabling more consistent performance and greater competition.

Figure 3A:
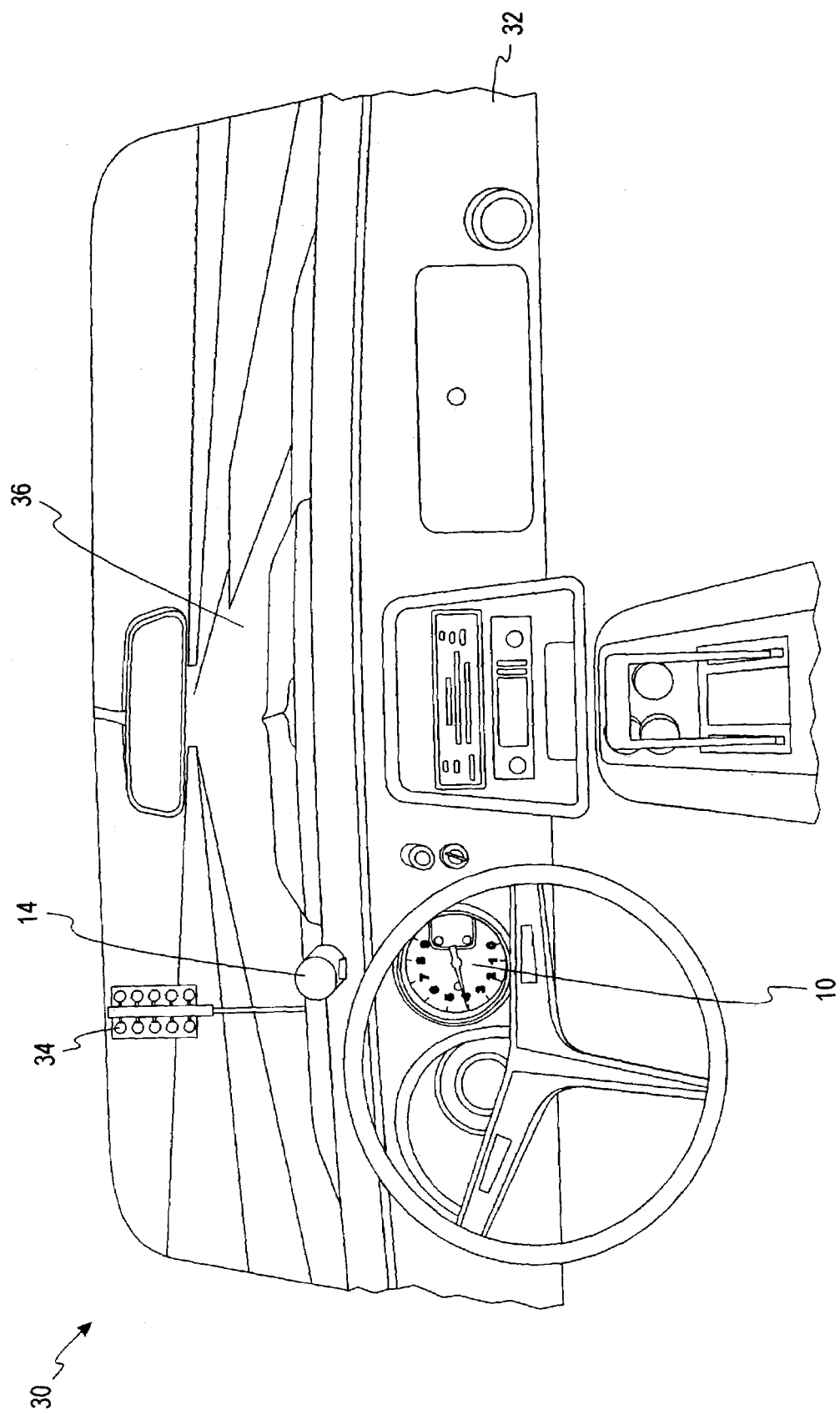
FIG. 3a illustrates one embodiment of a system embodying the invention in the cockpit of a racing vehicle.

Turning now to FIG. 3a, one embodiment of the use of the illustrative system is shown in a driver's view of the racing vehicle cabin 30 on the starting position of a drag strip 36. In this embodiment, the tachometer 10 is mounted on the front panel of the dashboard 32, and the indicator light 14 is mounted separately on the dashboard 32.

Figure 3B:
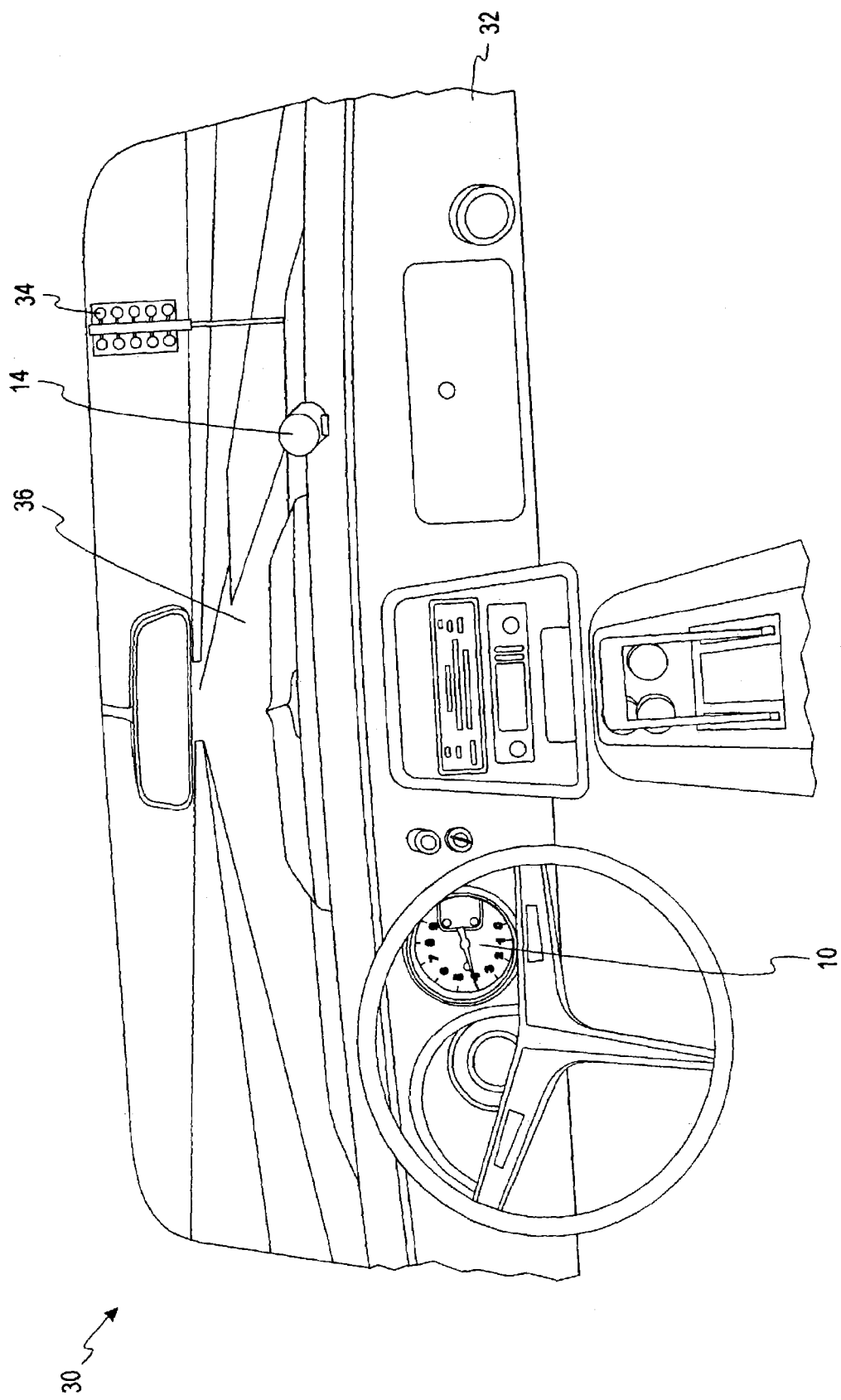
FIG. 3b illustrates another embodiment of a system embodying the invention in the cockpit of a racing vehicle.

Referring now also to FIG. 3b, another embodiment of the illustrative system is shown. In FIG. 3b the Christmas tree 34 is located to the right of the starting position on a drag strip 36 so that the indicator light 14 has been moved to a position to the right on the dashboard 32. The positioning of the indicator light 14 in the vehicle cabin may be more readily adaptable to a location relevant to the focal plane needed by the driver to see the Christmas Tree 34 while peripherally viewing the indicator light 14.

By being able to rely solely on the indicator light 14 to confirm the desired vehicle engine performance relevant to the start of the race, any changes or fluctuations in the ambient sound levels in the cabins of the vehicles, or outside the vehicle, are irrelevant to the concentration of the driver. In alternative embodiments, the indicator light 14 may be mounted on the tachometer 10.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A system for facilitating the launch of a drag racing vehicle with the engine running within a predetermined RPM range representing a desired RPM range having upper and lower limits for the engine during launching of the vehicle at the start of the race, said system comprising
   a tachometer coupled to the engine for monitoring the RPM of the engine,
   an indicator light positioned in the driver's compartment in the vehicle,
   a power source for supplying power to the indicator light for illuminating the light,
   a controllable switch connected between said power source and said indicator light for controlling when the power source is connected to the light and thus when the light is illuminated, and
   a controller connected to said tachometer and said switch for actuating said switch to illuminate said light when said tachometer indicates that the engine is running at an RPM within said predetermined RPM range representing a desired RPM range having upper and lower limits for the engine during launching of the vehicle at the start of the race.

2. The system of claim 1 wherein said controller includes means for flashing said light when said tachometer indicates that the engine is running at an RPM above said predetermined range.

3. The system of claim 1 wherein said controller includes means for extinguishing said light when said tachometer indicates that the engine is running at an RPM below said predetermined range.

4. The system of claim 1 wherein said light is adapted to be movable to different positions within said driver compartment for different race contexts.

5. The system of claim 1 which includes manual input means for supplying said controller with a desired engine RPM for launch.

6. The system of claim 1 wherein said launch is in a setting that includes a start light for a race, and said indicator light is positioned where it can be viewed by the driver of the vehicle while said driver is watching said start light.

7. A method of facilitating the launch of a drag racing vehicle with the engine running within a predetermined RPM range representing a desired RPM range having upper and lower limits for the engine during launching of the vehicle at the start of the race, said method comprising
   monitoring the RPM of the engine,
   positioning an indicator light in the driver's compartment in the vehicle,
   supplying power to the indicator light to illuminate the light when the engine is running at an RPM within said predetermined RPM range representing a desired RPM range having upper and lower limits for the engine during launching of the vehicle at the start of the race,
   manually controlling the engine to maintain illumination of said indicator light at the start of the race so that the vehicle is launched with the engine running at an RPM within said predetermined RPM range, and
   launching the vehicle when said indicator light is illuminated.

8. The method of claim 7 which includes flashing said light when the engine is running at an RPM above said predetermined range.

9. The method of claim 7 which includes extinguishing said light when the engine is running at an RPM below said predetermined range.

10. The method of claim 7 which includes moving said indicator light to different positions within said driver compartment for different race contexts.

11. The method of claim 7 which includes manually selecting a desired engine RPM for launch.

12. A method of facilitating the launch of a drag racing vehicle upon illumination of a start light located outside the vehicle in a stationary position on the race track, and with the engine running within a predetermined RPM range representing a desired RPM range having upper and lower limits for the engine during launching of the vehicle at the start of the race, said method comprising
   monitoring the RPM of the engine,
   positioning an indicator light in the driver's compartment in the vehicle where said indicator light can be viewed by the driver of the vehicle while said driver is watching the start light for the race,
   supplying power to the indicator light to illuminate the light when the engine is running at an RPM within said predetermined RPM range representing a desired RPM range having upper and lower limits for the engine during launching of the vehicle at the start of the race, and
   launching the vehicle when both said indicator light and the race start light are illuminated.

* * * * *